Jan. 17, 1967  G. W. SUTTON  3,298,356
GATE FOR POULTRY TROUGH
Filed Oct. 12, 1965
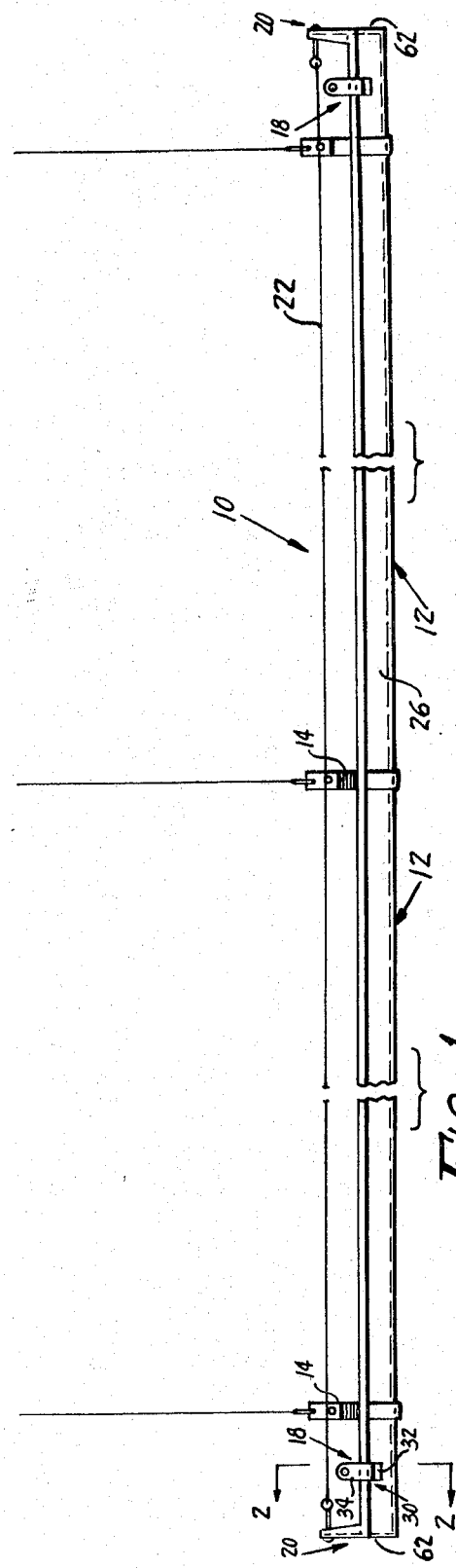
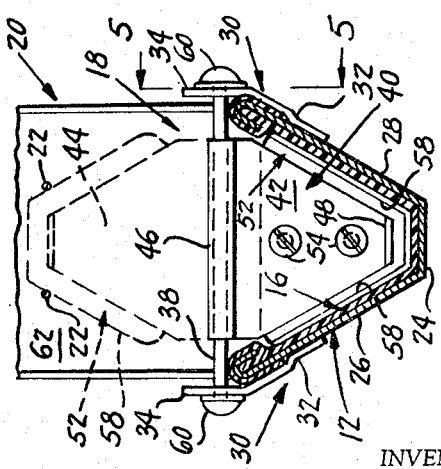
INVENTOR.
GERALD W. SUTTON
BY *Kimmel, Crowell & Weaver*
ATTORNEYS.

United States Patent Office 3,298,356
Patented Jan. 17, 1967

3,298,356
GATE FOR POULTRY TROUGH
Gerald W. Sutton, Sidney, Ohio, assignor to Everyday Manufacturing Company, Sidney, Ohio, a corporation of Ohio
Filed Oct. 12, 1965, Ser. No. 495,058
4 Claims. (Cl. 119—74)

This invention relates to a gate for poultry watering troughs, and more particularly to a gate for selectively retaining a body of liquid in such a trough.

Poultry watering troughs customarily include an elongate liquid-holding body having standing walls at each end thereof for retaining a body of liquid therein, examples of which are shown in United States Patents 2,828,-717 and 2,626,724. Several disadvantages attend the stationary endgate construction of the prior art devices, the foremost being the inability to clean the trough. It will be apparent that the right-angle construction and permanent securement of the endgate will enhance the accumulation of foreign material in trough corners. Another disadvantage of the prior art constructions is the inability to readily change the water in such a trough because of the lack of a suitable liquid outlet.

It is a primary object of the instant invention to provide a gate for poultry watering troughs which is positioned to retain a body of liquid within the trough and which may be displaced in order to clean the trough and allow stale water to flow outwardly therefrom.

Another object of the instant invention is to provide a gate which may be readily attached to pre-existing poultry watering troughs for retaining a body of liquid therein.

A further object of the instant invention is to provide a poultry watering trough including a gate suitably mounted thereon whereby the path of the trough may be readily cleaned.

Still another object of the instant invention is to provide a gate for poultry troughs which may be inexpensively manufactured, readily installed and expeditiously cleaned.

Still other objects and advantages of the instant invention, as well as the invention itself, reside in the combinations of elements, arrangements of parts, and features of construction and operation, all as will be more fully pointed out hereinafter and disclosed in the accompanying drawing wherein therein shown a preferred embodiment of this inventive concept.

In the drawing:
FIGURE 1 is a side elevational view of a continuous sectional watering trough having a gate mounted at each end thereof;
FIGURE 2 is an enlarged transverse cross-sectional view of the poultry watering trough of FIGURE 1 taken substantially along line 2—2 thereof when viewing in the direction of the arrows illustrating in solid lines a gate precluding liquid movement through the trough and illustrating in dashed lines that the gate may be swung out of liquid-restraining position;
FIGURE 3 is a front elevational view of the gate shown in FIGURE 2;
FIGURE 4 is a cross-sectional view of the gate of FIGURE 3 taken substantially along line 4—4 thereof viewing in the direction of the arrows; and
FIGURE 5 is a cross-sectional view of the poultry trough and gate of FIGURE 2 taken substantially along line 5—5 thereof viewing in the direction of the arrows.

Referring now to the drawing in detail, wherein like reference characters designate like elements throughout the several views thereof, there is indicated generally at 10 a watering trough having as its major components a plurality of cross-sections designated generally at 12 supported in a substantially horizontal attitude by a plurality of hangers 14. A continuous trough liner denominated generally at 16 may be provided throughout the length of trough 10 and provides a protective covering for sections 12. It should be pointed out that trough liner 16 constitutes no part of the instant invention but a more detailed description thereof may be found in the application filed concurrently herewith entitled "Liner for Poultry Watering Trough" by George F. Mitchell. The ends of trough 10 are closed by a gate designated generally at 18 mounted on the side of trough section 12 maintaining a body of water or other liquid within liner 16 such that fowl may partake thereof. An upstanding brace indicated generally at 20 is affixed at each end of trough 10 and provides a connection for a suitable anti-roosting device 22.

Trough section 12 provides a liquid-retaining cross-sectional configuration including a substantially horizontal bottom wall 24 and a pair of upwardly diverging side walls 26, 28, although it is to be understood that the configuration of trough section 12 may be of any conventional type. As more fully explained in the aforementioned concurrently filed application, trough section 12 and liner 16 are releasably secured together by a plurality of interlocking reverted edges. It should be understood that trough section 12 may be made of any suitable material, such as plastic, metal, wood, wire mesh or the like.

Gate 18 includes a pair of laterally disposed mounting brackets shown generally at 30 having a lower section 32 affixed to and closely residing against the outer surface of upwardly diverging side walls 26, 28. Brackets 30 also include a substantially vertical section 34 extending above the upper edge of side walls 26, 28 and forming an arcuate slot 36 above trough section 12 and receiving a shaft 38 therein crosswise to the longitudinal axis of trough 10.

Gate 18 also includes a substantially rigid body shown generally at 40 formed by a pair of rigid plates 42, 44, which may be made of metal, plastic, or any other suitable material, joined together at one end by a substantially cylindrical connector 46 slidably received about shaft 38. As may be seen from FIGURES 2 and 3, each of plates 42, 44 is shaped in approximately the same configuration as the interior of trough section 12 for purposes which will be apparent hereinafter.

As may be seen most clearly in FIGURE 4, each of plates 42, 44 carries an outwardly perpendicularly extending rigid foot 48, 50 with a sheet of flexible resilient material, such as rubber, indicated generally at 52 being sandwiched between plates 42, 44 and held in place by a pair of frictional fasteners, which are indicated as a pair of bolts 54 and nuts 56, although it should be understood that sheet 48 may be secured thereto by any conventional means. Sheet 48 extends beyond the bounds of plates 42, 44 as may be seen in FIGURES 3 and 4, to form a deformable sealing lip 58 which may be utilized to seal trough 10 against the passage of liquids therethrough.

In the assembly of gate 18, mounting brackets 30 will be affixed to side walls 26, 28 of trough section 12 by any conventional means, with cylindrical connector 46 of gate 18 being aligned with arcuate slots 36. Shaft 38 is then inserted through slots 36 and cylindrical connector 46 with a pair of enlarged bosses 60 being attached to the lateral ends of shaft 38. Bosses 60 may be of the threadably attachable type, of the push-on attachable variety, or of any other conventional type.

In the utilization of gate 18, an individual will swing body 40 about the axis of shaft 38 and connector 46 toward the center of trough 10 such that lip 58 comes into engagement with the sides of liner 16. Because of the deformable nature of lip 58, a certain amount of resistance will be created as body 40 approaches the vertical position. Since plates 42, 44 are complementarily configured with respect to the internal shape of trough 10, a substantial portion of lip 58 will be forcibly pressed against the sides of liner 16 effecting a water-tight seal. It will be readily apparent that rigid feet 48 aid in the construction of a seal adjacent bottom wall 24 of trough 10 substantially precluding the wrinkling of lip 58.

As may be seen in FIGURE 5, lip 58 is deformed to extend toward the center of trough 10 and is sandwiched between rigid foot 48 and bottom wall 24 providing a seal along bottom wall 24 with the upwardly diverging edges of lip 58 closely pressed against side walls 26, 28.

When it is desired to clean poultry trough 10, it is necessary only for an attendant to swing gate 18 counterclockwise as indicated by the arrow in FIGURE 5 to position it in the dotted line position shown in FIGURE 2. Liner 16 positioned within trough section 12 may then be expeditiously cleaned throughout the length thereof while gate 18 may be wiped clean with a rag or the like.

Brace 20 at each end of trough 10 preferably includes a solid sheet of metal 62 secured to the ends of trough section 12 and provided with an opening therein through which fluids within liner 16 may flow when gate 18 is moved to the dotted line or first position shown in FIGURE 2. As previously indicated, anti-roosting means 22 may be secured to sheet 62 in a conventional manner. It will be seen that the swinging movement of gate 18 into the sideline or second position shown in FIGURE 2 will retain a body of water or other liquid within trough 10.

It is now seen that there is herein provided an improved gate for poultry watering troughs which accomplishes all of the objects of this invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:
1. A liquid retaining trough for poultry and the like comprising:
   an elongate trough having a liquid retaining cross-sectional configuration and an open top;
   a liquid retaining gate generally complementarily shaped to the trough;
   flexible means carried by the gate for deformably sealably engaging the interior of the trough for precluding liquid movement therethrough; and
   means secured with the trough swingably mounting the gate on the trough about a horizontal axis from a first position out of the liquid retaining cross-sectional configuration to a second position where said body resides in the trough and the sealing means sealably engages the trough precluding liquid movement therethrough,
   the length of the gate and the sealing means from the axis to the free end thereof being substantially greater than the distance from the axis to the trough for compressing the sealing means to wedge the gate in the trough and binding the gate against the mounting means, the construction of the mounting means, gate and sealing means holding the gate in the liquid retaining position.

2. The trough of claim 1 wherein the mounting means includes
   a pair of brackets, secured to the trough on opposite sides thereof, having a pair of transversely aligned apertures; and
   a substantially horizontal shaft extending through the apertures mounting the gate for movement in the apertures; and wherein
   the gate is connected to the shaft.

3. The trough of claim 2 wherein the apertures are elongated and include a horizontal section and a vertical section.

4. The trough of claim 1 wherein the sealing means includes a flexible lip of sufficient length to provide a segment substantially flush with a major portion of the trough, the segment being on the side of the gate in contact with the liquid to be retained in the trough so that the water bears against the gate tending to force it into the closed position.

References Cited by the Examiner
UNITED STATES PATENTS
2,759,697   8/1956   Harza _____ 61—25 X FOREIGN PATENTS
956 of 1927   8/1928   Australia.

SAMUEL KOREN, *Primary Examiner.*
HUGH R. CHAMBLEE, *Examiner.*